Figure 1:
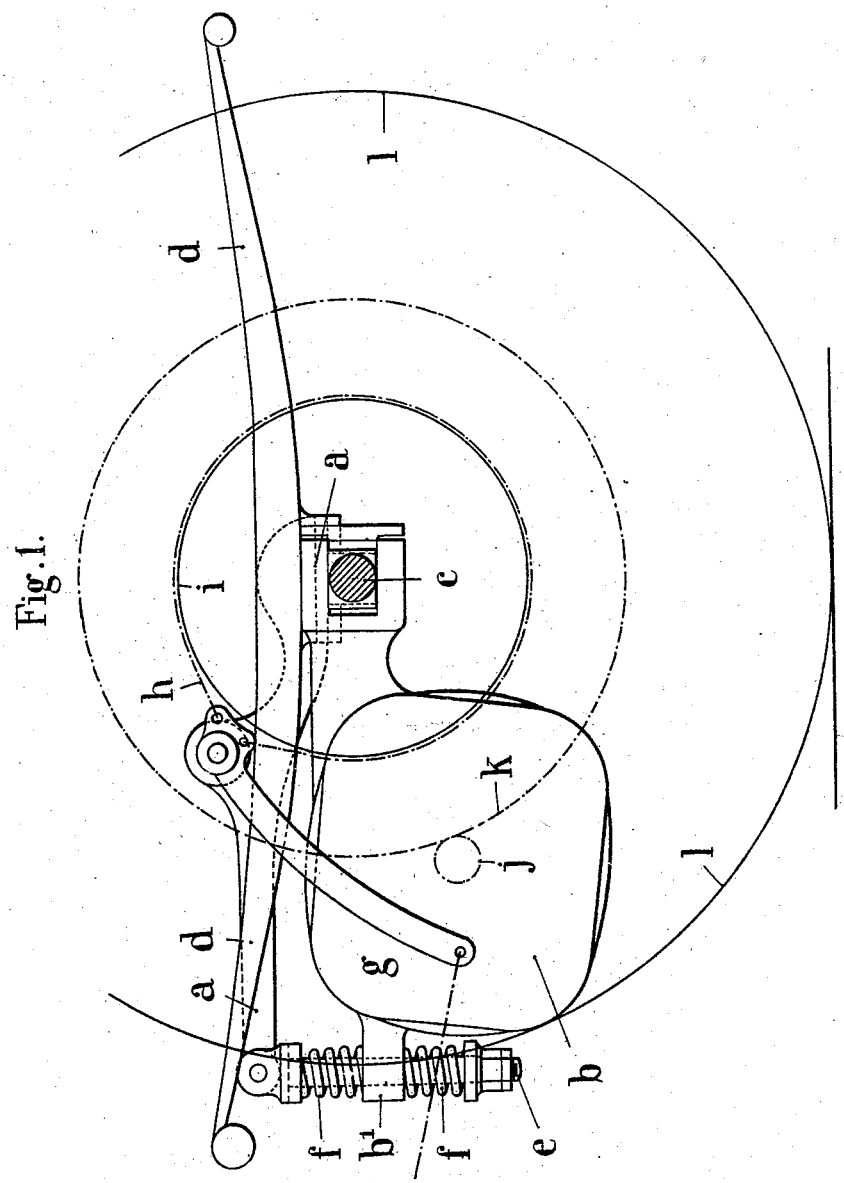

H. DUCASSE.
ELECTRICALLY PROPELLED ROAD VEHICLE.
APPLICATION FILED DEC. 31, 1904.

915,667.

Patented Mar. 16, 1909.
2 SHEETS—SHEET 1.

WITNESSES:
W. M. Avery
Walton Harrison

INVENTOR
Henry Ducasse
BY
ATTORNEYS

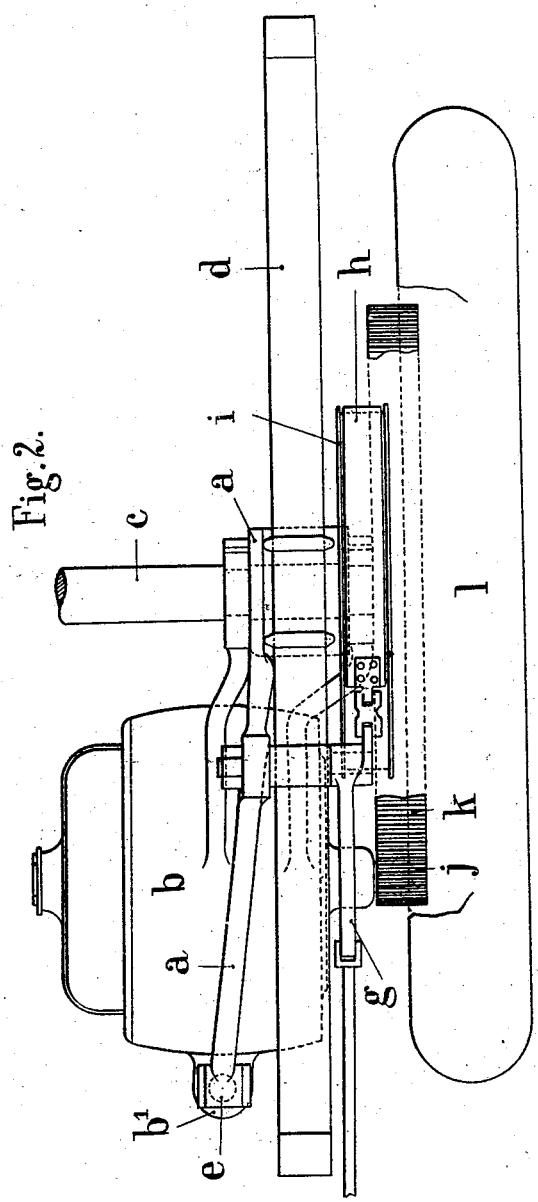

UNITED STATES PATENT OFFICE.

HENRY DUCASSE, OF PARIS, FRANCE, ASSIGNOR TO SOCIÉTÉ ANONYME L ELECTRIQUE, OF PARIS, FRANCE.

ELECTRICALLY-PROPELLED ROAD-VEHICLE.

No. 915,667.     Specification of Letters Patent.     Patented March 16, 1909.

Application filed December 31, 1904. Serial No. 239,137.

To all whom it may concern:

Be it known that I, HENRY DUCASSE, of 17 Rue Jean Goujon, in the city of Paris, Republic of France, manufacturer, have invented Improvements in Electrically-Propelled Road-Vehicles, of which the following is a full, clear, and exact description.

This invention relates to improvements in electrically propelled road vehicles and comprises an arrangement whereby the motor has a fixed and rigid support upon the rear axle of the vehicle which support may also serve as the fixed point of attachment for the brake strap. This improvement possesses the advantage of rendering the motor absolutely independent of the frame, and thus preventing the vibrations of the motor in working and those due to inequalities of the ground being transmitted to the vehicle.

The improvements are illustrated in the accompanying drawings wherein—

Figure 1 shows in elevation the entire arrangement for the support of the motor and attachment of the brake strap. Fig. 2 is a plan view thereof.

The same letters of reference indicate like parts in all the figures.

As shown in the drawing the rigid support $a$ of motor $b$ is fixed to the axle $c$ either upon the box of the spring $d$ or upon any other suitable part of said axle. The form of this rigid support may be varied according to its position upon the axle. Upon the free end of the support $a$ is mounted the suspension rod $e$ which passes through a lug $b^1$ upon the motor casing, which lug is interposed between two springs $f$ so as to provide an elastic suspension for the motor and prevent the transmission of vibrations to the frame of the vehicle. Upon the rigid support $a$ may be jointed a lever $g$ to which are attached the ends of the brake strap $h$ which encircles the drum $i$. The motor $b$ transmits motion to the vehicle wheels $l$ through pinion $j$ and gear wheel $k$.

From the foregoing, it will be seen that the suspension mechanism for the motor is absolutely independent of the frame and of the body of the vehicle and that it is sufficient for the suspension of the motor; this mechanism is fixed upon the box of the axle the motor being then entirely independent.

Claim:

The combination with the axle, and the bearing box engaged by the axle, of an arm rigid with the bearing box, a motor having an arm journaled on the axle, a rod pivoted to the first named arm and depending therebelow, said motor being provided with a sleeve through which the rod passes, a nut on the free end of the rod, and springs arranged between the sleeve and the nut, and the sleeve and the rigid arm.

The foregoing specification of my improvements in electrically propelled road vehicles signed by me this twelfth day of December 1904.

HENRY DUCASSE.

Witnesses:
    JOHN BAKER,
    MAURICE H. PIGNET.